UNITED STATES PATENT OFFICE.

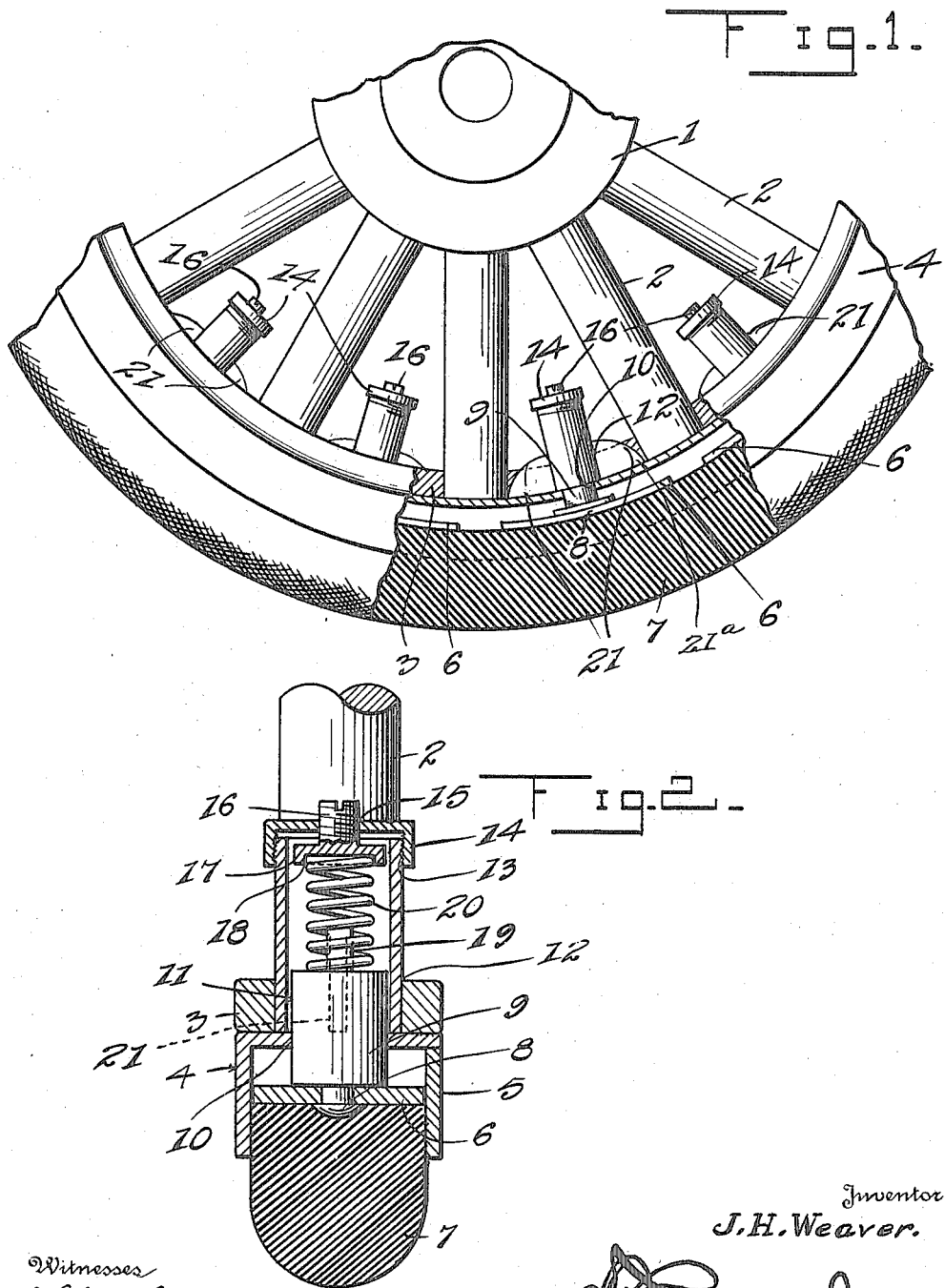

JAMES H. WEAVER, OF ELK POINT, SOUTH DAKOTA.

SPRING-TIRE.

1,181,813.  Specification of Letters Patent.  Patented May 2, 1916.

Application filed September 29, 1914. Serial No. 864,061.

*To all whom it may concern:*

Be it known that I, JAMES H. WEAVER, a citizen of the United States, residing at Elk Point, in the county of Union and State of South Dakota, have invented certain new and useful Improvements in Spring-Tires; and I do hereby declare the following to be a full, clear, and exact description of the invention, such as will enable others skilled in the art to which it appertains to make and use the same.

The primary object of this invention is to provide a cushioned attachment designed to be applied to the felly of a wheel, and of such construction that the component parts of which the attachment is composed can be assembled to provide a unitary structure that can be conveniently and expeditiously applied to the wheel felly.

Another object of the invention is to provide a novel type of bracing means for the attachment and will effectively brace the various parts thereof against strain.

Other objects will appear and be better understood from that embodiment of my invention of which the following is a specification, reference being had to the accompanying drawing forming a part thereof, in which:—

Figure 1 is a fragmentary side elevation of a wheel being partly broken away and showing the attachment applied to the tire in section, and Fig. 2 is a vertical sectional view taken through the wheel, enlarged and showing in detail one of the resilient supporting members.

Referring to the drawings by characters of reference, the numeral 1 designates as an entirety the hub of a wheel, 2 the spokes connected with the hub and 3 a wooden felly secured to the spokes. Mounted upon the wooden felly 3 is a steel rim 4 that is approximately U-shaped in cross section and has a removable side portion 5.

Slidably mounted within the rim 4 is a flat sectional metallic band 6 upon which is mounted a solid rubber or other similar cushion tread 7. The tread 7 is arranged within the rim 4 so that its sides engage the inner faces of the sides of the rim 4. Secured by suitable fastening elements 8 to the under faces of the sections of the band 6 at spaced points are a number of preferably cylindrical lugs or projections 9 that are slidable through openings 10 in the body portion of the rim 4 and openings 11 in the felly 3. The openings 10 and 11 aline and are disposed at points between the spokes 2 as clearly shown in Fig. 1.

Secured to the rim 3 and projecting inwardly therefrom at points between the spokes 2, are cylindrical casings 12 of greater diameter than that of the lugs 9. The secured ends of these casings 12 are disposed preferably within the openings 11 in the rim thus the free or outer ends of the lugs 9 extend within the casings and are slidable therein. The outer external faces of the casings are provided with screw threads 13 and mounted on said screw threaded ends are flange closure caps 14 that are internally screw threaded on said flanges thereof.

Mounted within a central opening 15 formed in each of the caps 14 is an adjusting screw 16 which at its inner end is provided with an enlarged flat annular head 17. The head 17 is formed with a recess 18 in its outer face. The opening 15 in each of the members 14 is screw threaded so that the screw 16 may be adjusted to cause the head 17 to move toward and away from the cap 14.

Formed on the inner ends of the lugs 9 are reduced extensions 19. Mounted on the extensions 19 and within the recesses 18 on the head 17 are expansive helical springs 20 that are of sufficient size and tension to dispose the band 6 in normal spaced relation to the body or plate of the rim 4. These springs 20 resiliently support or hold the tread 7 in extended position so that when weight is on the tire they will be compressed. Adjustment of the tension of the springs may be had by turning the caps 14 or the screws 16. The screw caps 14 may be removed for the purpose of renewing a spring or some other part which may have become deranged.

As a means for bracing the casings 12 also the mechanism therein, I provide on either side of each casing arcuate bracing plates 21, each of which is secured respectively at its ends to the casing and the wooden felly 3. The braces 21 have those ends which are connected to the felly 3 positioned in diametrically opposed slots 21ª, which open into the opening 11 and have their rear inner walls undercut and engaging over the adjacent ends of the braces 21. These bracings prevent distortion or derangement of the casings when an exceedingly heavy load is placed upon the tire at any one point, or particularly when making a short curve or skidding.

With reference to the foregoing description and accompanying drawings it will be observed that I have provided a cushion attachment for the felly of simple construction that will prove durable and which possesses all of the resiliency of an ordinarily constructed pneumatically tired wheel.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

The combination with a wheel felly having a plurality of openings therein and diametrically opposed slots communicating with the openings, the rear walls of the slots being undercut, a rim encircling the felly and engaging the same and having openings therein registering with the openings in the felly, a movable tread associated with the rim, casings carried by the rim and extending through the openings in the felly, means yieldably supporting the tread and extending through the openings in the rim and into the casings, and arcuate shaped braces disposed on opposite sides of the casings and each having one end thereof engaging under the adjacent undercut end wall of the adjacent slot and its opposite end connected to the adjacent casing.

In testimony whereof I affix my signature in presence of two witnesses.

JAMES H. WEAVER.

Witnesses:
THOMAS McINERNY,
W. M. McDONALD.

Copies of this patent may be obtained for five cents each, by addressing the "Commissioner of Patents, Washington, D. C."